United States Patent
Anderson et al.

[11] Patent Number: 6,165,418
[45] Date of Patent: Dec. 26, 2000

[54] SYSTEM FOR CONTROLLING TEMPERATURE OF A CONTINUOUS POLYMERIZATION PROCESS

[75] Inventors: David H. Anderson, Woodstown, N.J.; Kirk D. Carver, Beaumont, Tex.; Richard M. Coon, Port Arthur, Tex.; David J. Sandell, Beaumont, Tex.

[73] Assignee: Mobil Oil Corporation, Fairfax, Va.

[21] Appl. No.: 09/106,677

[22] Filed: Jun. 29, 1998

[51] Int. Cl.[7] .............................. G05D 23/00; G05D 7/00; B01J 8/18

[52] U.S. Cl. .......................... 422/109; 422/110; 422/131; 422/138; 422/139; 422/146; 526/920

[58] Field of Search ....................... 422/131, 132, 422/138, 139, 146, 109, 110; 526/920, 919, 921

[56] References Cited

U.S. PATENT DOCUMENTS

| | | | |
|---|---|---|---|
| 4,011,382 | 3/1977 | Levine et al. | 526/96 |
| 4,588,790 | 5/1986 | Jenkins, III et al. | 526/70 |
| 5,608,019 | 3/1997 | Cheruvu et al. | 526/129 |
| 5,731,392 | 3/1998 | Ali et al. | 526/74 |

OTHER PUBLICATIONS

D.E. Seborg, T.F. Edgar, and D.A. Mellinchamp, *Process Dynamics and Control*, pp. 183–196 and 676–677, Wiley, 1989.

B.G. Liptak, Editor, *Instrument Engineer's Handbook: Process Control*, pp. 10–11, Chilton Book Co., 1995.

*Primary Examiner*—Hien Tran
*Attorney, Agent, or Firm*—Dennis P. Santini

[57] ABSTRACT

A system for controlling temperature of a polymerization process includes a primary reactor system having a polymerization reactor and a recycle gas line which includes a heat exchanger, a primary temperature controller which continuously measures temperature within the reactor and provides a coolant adjust signal, a secondary cooling system which circulates a mixture of fresh and recirculated coolant through the heat exchanger and a secondary temperature controller which continuously measures the temperature of the mixed coolant and adjusts the proportion of mixed coolant to fresh coolant based on the coolant adjust signal and the temperature of the mixed coolant.

6 Claims, 3 Drawing Sheets

SYSTEM FOR CONTROLLING TEMPERATURE OF A CONTINUOUS POLYMERIZATION PROCESS

BACKGROUND OF THE INVENTION

1. Field of the Invention

The present invention relates to continuous polymerization processes and more particularly relates to an improved system for controlling the temperature of the reactor during such processes.

2. Background of the Invention

Polymerization refers to the process of linking small molecules (monomers) to make larger molecules (polymers). Polymers, for example polyolefins such as polyethylene, when combined with other ingredients may be manufactured into commercially useful plastics, rubbers, fibers and coatings. There are a number of processes for achieving polymerization, each designed for various conditions and end products.

A typical system for commercially producing a diversity of polymers is generally shown in FIG. 1. The chemical reactions to produce the polymer take place in a chemical reactor 10. The chemical reactor may take the form of a fluidized bed, a gas-phase reactor, a stirred tank, or a slurry reactor. The reactor is continuously fed with a gaseous monomer through a closed-loop gaseous supply line 11. The inlet 21 for the gaseous stream is at a point in the lower region of the reactor usually at the very bottom of the reactor to insure adequate uniformity of the gaseous stream passing upwardly through the reactor. A catalyst is continuously added to the reactor to activate the polymer producing reaction. Normally the rate of catalyst injection is used to control the rate of polymer production. The reacted polymer product is removed from the reactor and the portion of the gaseous stream which did not react exits the reactor and becomes the recycled stream. New monomer gas is added to the recycled stream to make up for the removed polymer.

The polymer forming reaction within the reactor is exothermic, making it necessary to maintain in some fashion the temperature of the gas stream inside the reactor. An essentially constant temperature in the reactor is necessary to produce polymer product having consistent properties. The temperature within the reactor is basically dependent on three factors: 1) the rate of catalyst injection into the reactor which controls the rate of polymerization and the attendant rate of heat generation; 2) the temperature of the gas recycle stream and 3) the volume of the recycle stream passing through the reactor. A common method of heat removal employed in conventional continuous polymerization processes is by compression and cooling of the recycled gas stream at a point external to the reactor. The temperature of the reactor is usually controlled by compressing the recycled stream in a compressor 12 and then passing the stream through a heat exchanger 13 where the heat of the chemical reaction is removed from the recycled stream before it is returned to the reactor.

The heat exchanger 13 typically includes a coolant supply line 14 connected to the exchanger which includes a pump 15 for advancing the coolant through the exchanger, a fresh coolant inlet 16, a recirculated coolant discharge 17 and a valve 18 for adjusting the proportion of fresh coolant to recirculated coolant. The heat from the recycled gas stream is transferred to the coolant within the heat exchanger and the cooled recycled stream returns to the reactor.

A common temperature control strategy for polymerization reactors consists of cascading the reactor temperature to the coolant temperature in a 2-level control scheme. A master controller 19 monitors the reactor temperature and transmits a signal to a slave controller 20 when the temperature within the reactor increases above the master controller's set point. The signal transmitted to the slave controller is a new lower coolant temperature set point for the slave controller. In conventional systems, the slave controller monitors the temperature of the recycled stream at the inlet 21 of the reactor with respect to its own set point. In response to a new set point from the master controller, the slave controller increases the flow of fresh coolant by opening the control valve of the heat exchanger coolant line. The amount that the control valve is opened by the slave controller is dependent on the slave controller's set point, provided by the master controller, and the temperature of the recycled gas being monitored at the reactor inlet 21.

However, there is significant dead time between the time the fresh coolant rate changes and the time the reactor gas inlet temperature responds. This dead time is the time required for the coolant to travel from the fresh coolant inlet to the heat exchanger plus the time taken for the recycle stream of gas exiting the heat exchanger to reach the reactor inlet. As a result, the slave controller will continue to change the fresh coolant flow rate until the reactor inlet temperature responds. Often, the slave controller overshoots during the dead time before the controller knows it has gone too far which results in overcooling of the recycled stream during the dead time. This makes it necessary to keep the slave controller from responding too quickly. On the other hand, if the controller acts too slowly, reactor temperature can move far away from its set point whereby the reactor overheats before the controller responds. Accordingly, there is a need for an improved temperature control method for a continuous polymerization process which provides excellent responsiveness in maintaining reactor temperature near a set point during load changes of production.

SUMMARY OF THE INVENTION

The present invention is an improved system for controlling temperature of a polymerization process. The system generally includes a primary reactor system, a primary temperature controller, a secondary cooling system and a secondary temperature controller. Unlike conventional systems, however, the secondary temperature controller of the present invention monitors and controls the temperature of coolant within the secondary cooling system. Controlling the temperature of the coolant as opposed to controlling reactor inlet temperature significantly increases the responsiveness of the system with little to no control instability.

The primary reactor system includes a polymerization reactor, which is preferably a fluidized bed type reactor, and a gas line for recycling gas exiting the reactor back to the reactor. The gas line includes a heat exchanger which is connected to the secondary cooling system. The secondary cooling system circulates coolant through the heat exchanger to cool the recycled gas stream. The secondary cooling system includes a mixer for mixing fresh coolant and recirculated coolant and a pump for advancing the mixed coolant through the heat exchanger. The primary temperature controller continuously measures temperature within the reactor and transmits signals to the secondary temperature controller. The secondary temperature controller continuously measures temperature of the mixed coolant before entering the heat exchanger and adjusts the proportion of fresh coolant to recirculated coolant based on the signals received from the primary temperature controller.

In a preferred embodiment, the gas line is an arrangement of conduits through which the gas flows and includes a monomer feed for introducing fresh gas into the line, a compressor and a reactor outlet for removing polymer product from the line. The mixer preferably includes an arrangement of conduits through which the coolant flows, a fresh coolant inlet, a recirculated coolant inlet, a junction for the inlets, a mixer outlet and a control valve connected to the recirculated coolant inlet for diverting recirculated coolant away from the mixer. Preferably, the secondary temperature controller measures temperature at a point just downstream of the mixer outlet.

The method of controlling temperature of a polymerization process in which a heat exchanger is used to cool reaction effluent includes the steps of continuously monitoring temperature of a polymerization reactor, generating a coolant adjust signal and adjusting the temperature of a mixture of fresh coolant and recirculated coolant being fed to the heat exchanger based on the coolant adjust signal. Preferably, the temperature of mixed coolant is also continuously monitored and a secondary signal is generated to adjust the fresh coolant flow rate based on the temperature of the mixed coolant.

As a result of the present invention a system for controlling the temperature of a continuous polymerization process is provided having improved responsiveness in maintaining reactor temperature near a set point during load changes. By moving the control point to the secondary cooling system, the temperature controllers can be made much more responsive to provide almost immediate feedback to the system. Moreover, the present invention provides an improved temperature control method which can be easily adapted to existing conventional systems.

These and other objects, features and advantages of the present invention will become apparent from the following detailed description of the illustrative embodiments thereof which is to be read in conjunction with the accompanying drawings.

DETAILED DESCRIPTION OF THE PREFERRED EMBODIMENT

The present invention is a new system and method for controlling reactor temperature in a polymerization process wherein the coolant adjustment is more responsive to measurements of the reaction temperature than those systems known in the art. The increased response is achieved by significantly reducing the "dead time" between coolant adjust and temperature response. As discussed above, dead time is detrimental to a control system and efforts should be made to minimize it. Thus, the present invention has significantly overcome this problem by use of a secondary controller which controls the coolant temperature at or downstream of a mix point between fresh coolant and recirculated coolant.

Figure 1:
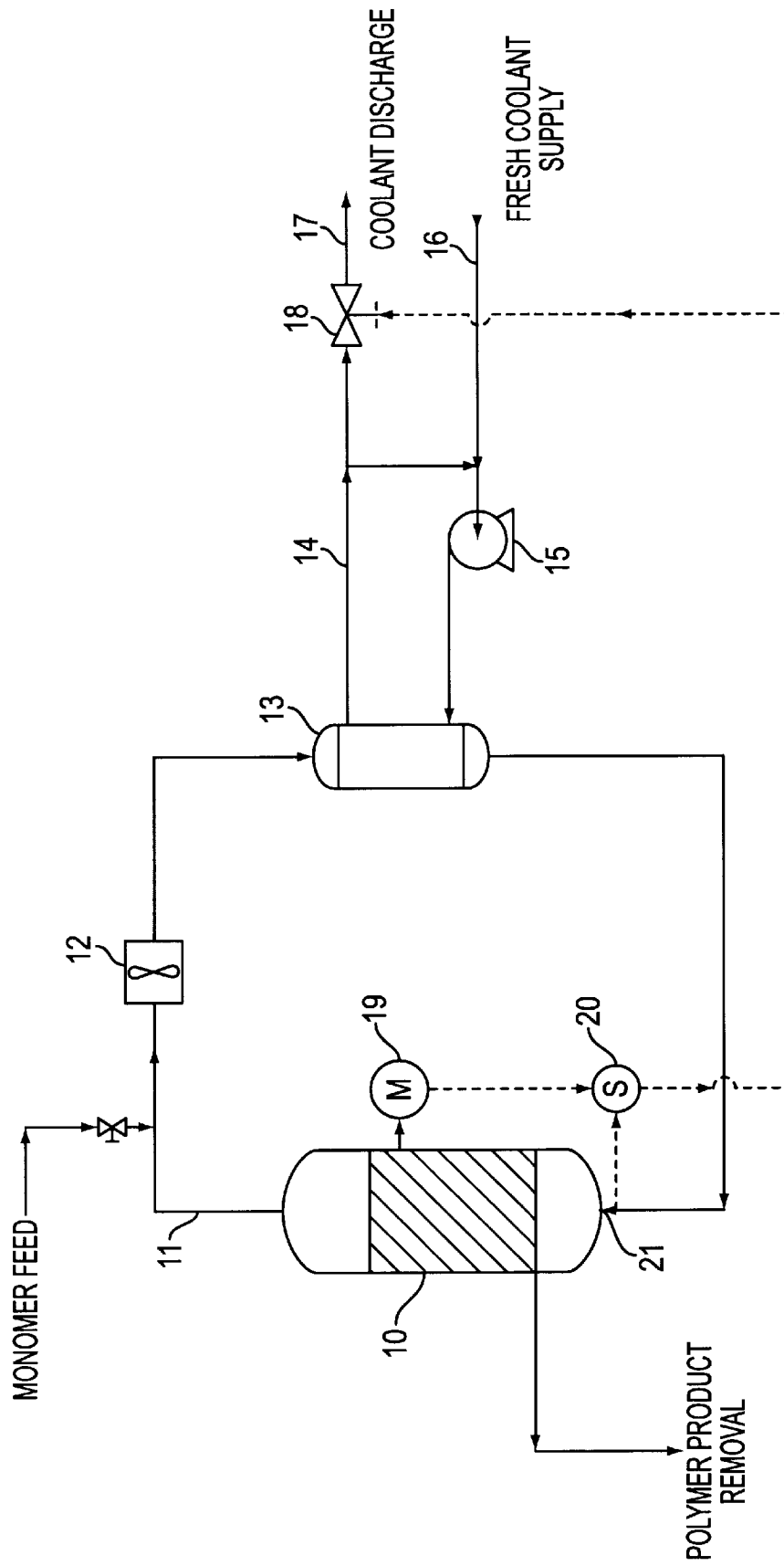
FIG. 1 is a schematic diagram of a prior art continuous polymerization process.
Figure 2:
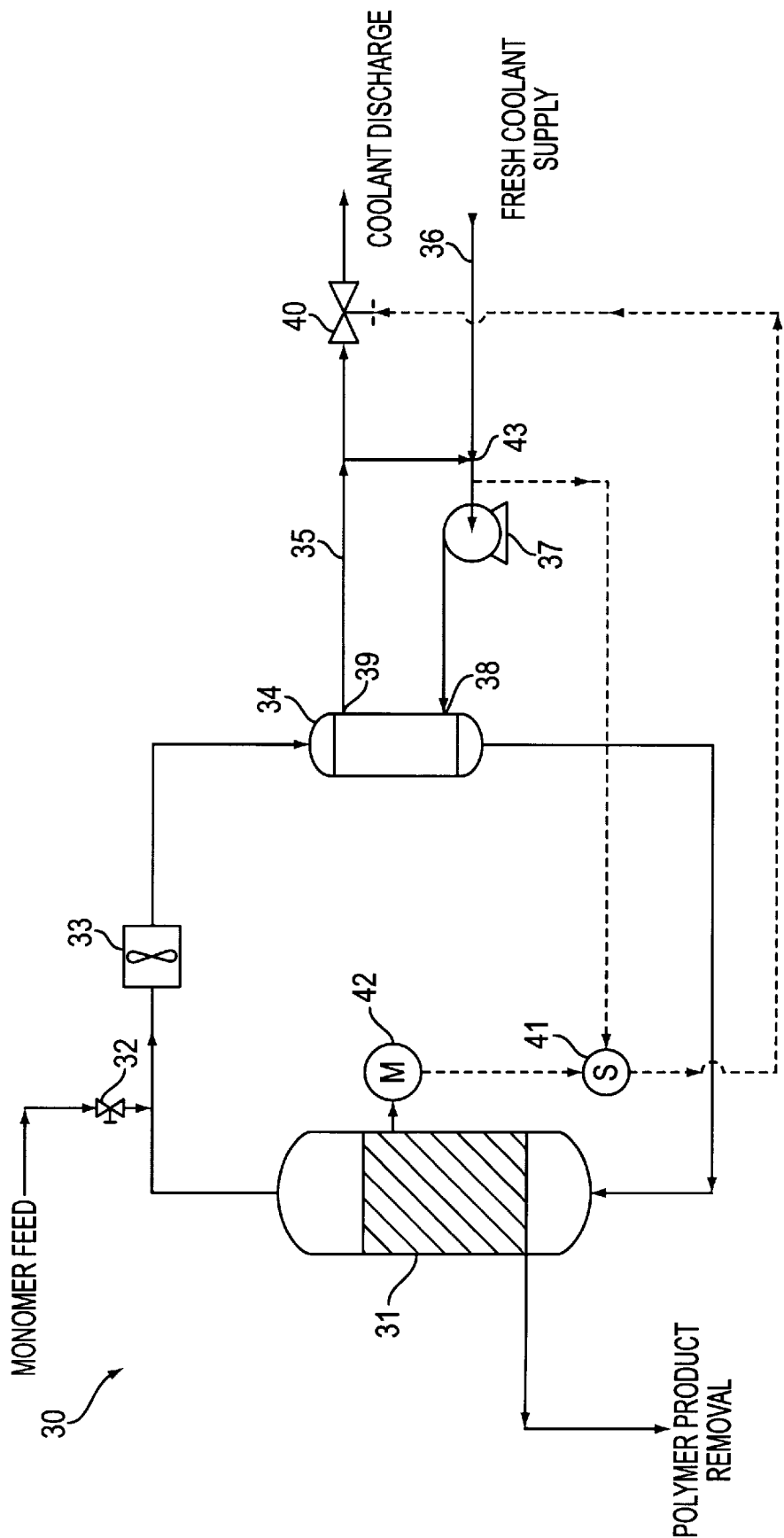
FIG. 2 is a schematic diagram of the system for controlling temperature of a continuous polymerization process according to the present invention.

Referring now to FIG. 2, a schematic diagram of a system 30 for controlling temperature of a continuous polymerization process in accordance with the present invention is shown. The system depicted in FIG. 2 is similar in many respects to the conventional system described above and depicted in FIG. 1. The polymerization reaction occurring within the reactor 31 produces a polymer which is continuously removed from the reactor leaving an unreacted gas stream exiting the reactor. In a preferred embodiment, the reactor is a fluidized bed type reactor. Make-up monomer is fed to the gas line through a control valve 32 and the gas is recycled to the reactor 31. Control valve 32 may be located upstream or downstream of the reactor 31. The polymerization reaction generates heat which must be removed from the recycled gas stream by cooling. The gas stream is first compressed by a compressor 33 before entering a heat exchanger 34. As described above, the heat exchanger 34 is supplied with a coolant which absorbs the heat of the recycled gas stream thereby cooling the stream. The coolant is supplied from a coolant feed line 35 which includes a fresh coolant inlet 36 for introducing fresh coolant into the line, a pump 37 for advancing the coolant through the line, a heat exchanger inlet 38 and outlet 39 and a control valve 40 for discharging recirculated coolant from the line. Opening the control valve 40 allows recirculated coolant to exit the line thereby increasing the proportion of fresh coolant entering the heat exchanger 34. The increased percentage of fresh coolant decreases the temperature of the coolant entering the heat exchanger which in turn cools the gas stream flowing through the heat exchanger to the reactor.

The control valve 40 is activated by a secondary controller 41 which receives a coolant adjust signal from a primary controller 42 in a 2-level control scheme. The primary controller 42 monitors the temperature of the reactor 31 and transmits a coolant adjust signal to the secondary controller 41 when the reactor temperature is too high. In response, the secondary controller 41 opens the control valve 40 to increase the proportion of fresh coolant entering the heat exchanger 34 thereby cooling the gas stream.

Thus far described, the system includes conventional components operating in a manner as described above. However, unlike conventional systems, the secondary controller 41 of the present invention is coupled to the coolant feed line 35 of the heat exchanger 34 as opposed to the reactor inlet. In a preferred embodiment, the coolant feed line 35 includes a discrete mix point 43 defined by the point where the fresh coolant enters the line and mixes with the recirculated coolant. It has been found that the preferred location for connecting the secondary controller 41 to the coolant feed line is at a point just downstream of the mix point 43 and upstream of the heat exchanger 34. At this point, the recirculated coolant and the fresh coolant are fully mixed thereby providing more accurate measurement and control.

The advantage in connecting the secondary controller 41 to the coolant feed line 35 is due to the inherent characteristics of feedback controllers. The primary controller 42 and the secondary controller 41 are conventional PID or PI continuous feedback controllers which transmit an output signal based on the error difference between a set point and a measured value. In the case of the primary controller 42, its output is a new set point transmitted to the secondary controller 41 based on the error difference between its set point and the measured temperature of the reactor. In the case of the secondary controller 41, its output is an electrical signal sent to the control valve 40 based on the error difference between the set point received from the master controller 421 and its measured value. Connecting the secondary controller 41 to the coolant feed line 35 as opposed to the reactor inlet moves the measured variable (ie, the temperature of the coolant), closer to the control valve 40. This is the location where the temperature responds soonest after the secondary controller moves the control valve.

It has been found that changing the temperature of the coolant results in a substantially corresponding change in the reactor temperature. So that a change in temperature of the mixed coolant will produce a predictable corresponding change in the reactor temperature, e.g., a change of 1° C. or F. in the mixed coolant temperature will result in an approximately similar 1° change in the reactor temperature. Therefore, use of the mix point temperature information provides "feedforward" control to the reactor temperature. The present invention minimizes the dead time in temperature response by controlling the temperature at or down stream of the mix point of the coolant feed line 35 as opposed to the reactor inlet. With little to no dead time now in the secondary control loop, the secondary controller can be tuned to respond more quickly to deviations from its set point without overshooting the set point.

Figure 3:
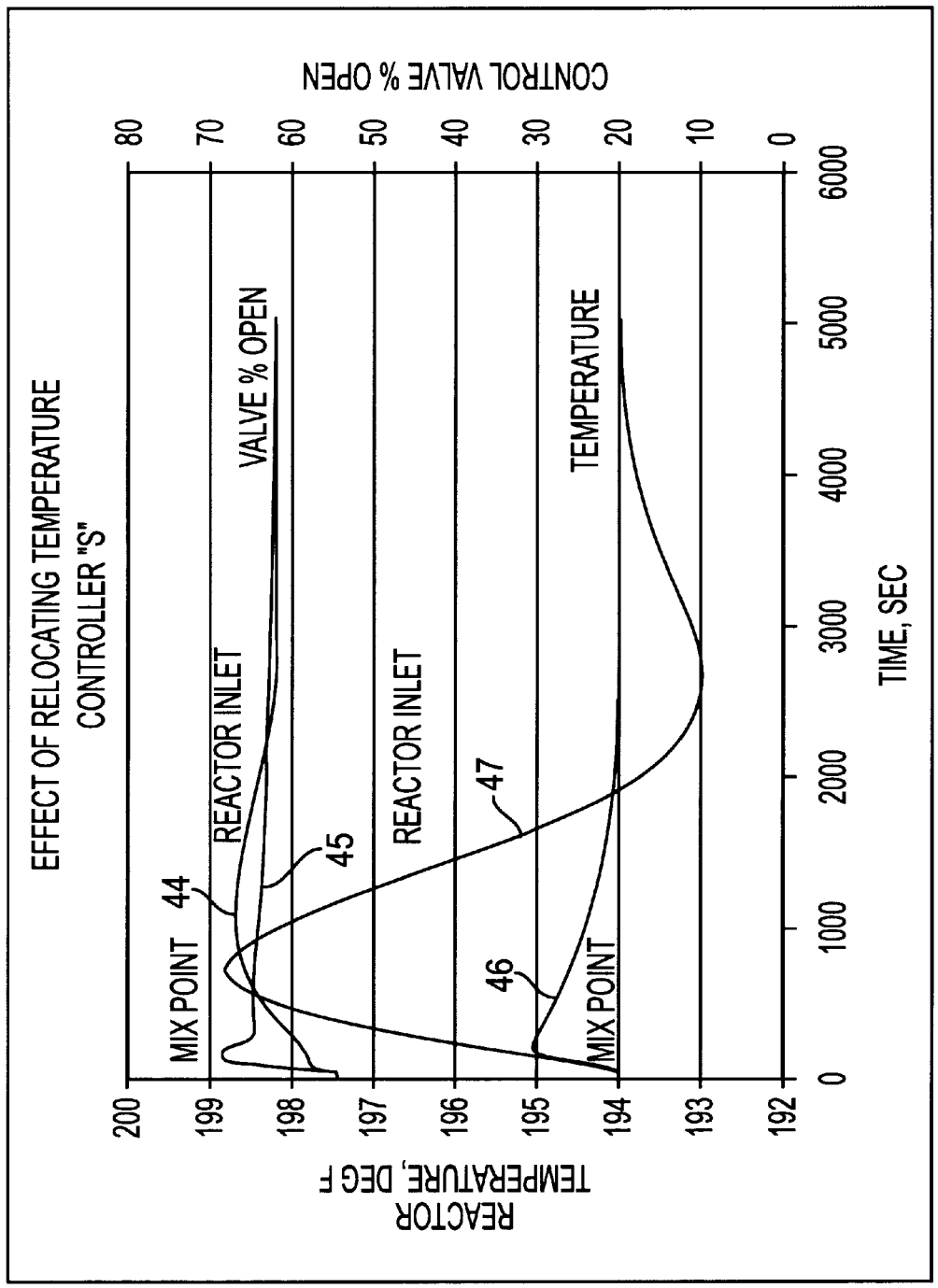
FIG. 3 is a graphical representation of the improved results achieved in utilizing the present invention.

Quite amazingly, it has been discovered by dynamic computer simulation that much more effective control of the reactor temperature is achieved by controlling the temperature of the coolant feeding the heat exchanger as opposed to controlling the temperature of the recycle gas stream entering the reactor. Referring to FIG. 3, computer simulated results of relocating the input signal of the secondary controller are presented. The graph in FIG. 3 shows the response of reactor temperature and control valve position in response to a sudden 25% increase in reaction heat generation. Cases with reactor inlet temperature control and mix point temperature control are shown. Where the secondary controller receives its input signal from the reactor inlet, reactor temperature increases from 194° to above 199° F. in less than fifteen minutes, as shown by curve 47, when the reactor experiences a 25% increase in heat generation. Due to the effects of dead time, it has been found that the control valve must move slowly, as shown by curve 44, from about 55% to 65% open in response over this time period to prevent overshooting and oscillations with unstable control. Even so, some overshooting occurs as shown by curve 47.

In contrast, when controlling the temperature at or downstream of the mix point in the coolant feed cycle and making the secondary temperature controller more responsive, the control valve responds much more quickly, as shown by curve 45, preventing the reactor temperature from exceeding set point by more than about 1° F. as shown by curve 46. Additionally, there is no overshooting of the reactor temperature. This is primarily due to the fact that there is a nearly constant offset between the reactor inlet temperature and the coolant temperature at the mix point. Therefore, control of the coolant temperature has a concomitant effect on the reactor inlet temperature. The advantage in controlling the coolant temperature is the relatively small dead time between the time the control valve is activated and the time the response is measured. Thus, temperature control is made much more responsive with little to no control instability.

Of course, to reduce dead time further, the length of coolant line conduit between the mix point and the heat exchanger, as well as the length of recycle gas conduit between the heat exchanger and the reactor should be kept at a minimum. Also, variations of the present invention would include moving the point of measuring coolant temperature as long as it truly reflects the coolant temperature after mixing and before entering the heat exchanger. Other variations would include comparable mechanical arrangements for bleeding recycled coolant and/or mixing fresh coolant to provide the new cooled mixture introduced to the heat exchanger.

Although the illustrative embodiments of the present invention have been described herein with reference to the accompanying drawings, it is to be understood that the invention is not limited to those precise embodiments and that various other changes and modifications may be effected therein by one skilled in the art without departing from the scope or spirit of the invention.

What is claimed is:

1. A system for controlling temperature of a polymerization process comprising:

(a) a primary reactor system having a polymerization reactor and a recycle gas line which includes a heat exchanger and provides continuous flow of gas exiting said reactor through said heat exchanger and back to a reactor feed in said reactor;

(b) a primary temperature controller which continuously measures temperature of a polymerization reaction in said polymerization reactor and provides a signal for coolant adjust for use in controlling reaction temperature;

(c) a secondary cooling system for said heat exchanger which includes a coolant feed line which circulates fluid coolant through said heat exchanger, a pump interposed in said coolant feed line to advance said fluid coolant through said coolant feed line, and a mixer in said coolant feed line which mixes fresh coolant and recirculated coolant; and (d) a secondary temperature controller which continuously measures temperature of fluid coolant at a point along said coolant feed line at/or downstream of said mixer and upstream of said heat exchanger, said secondary controller being connected to said primary temperature controller for receipt of said coolant adjust signal and said secondary controller also connected to said mixer to adjust proportion of fresh coolant and recirculated coolant to provide a temperature which corresponds to said coolant adjust signal, whereby the temperature of said polymerization process is controlled.

2. The system as defined in claim 1, wherein said polymerization reactor is a fluidized bed reactor.

3. The system as defined in claim 1 wherein said recycle gas line comprises an arrangement of conduits through which said gas flows and includes a monomer feed for introducing fresh gas into said recycle gas line, a compressor and wherein the reactor further includes a reactor outlet for removing polymer product.

4. The system as defined in claim 1, wherein said mixer comprises an arrangement of conduits through which said coolant flows, a fresh coolant inlet for introducing fresh coolant, a recirculated coolant inlet for introducing recirculated coolant, a junction of said two inlets for receiving fresh coolant and recirculated coolant, respectively, a mixer outlet directing the combination of fresh and recirculated coolant received from said inlets, and a control valve connected to said recirculated coolant inlet for diverting recirculated coolant away from said mixer, whereby the proportion of recirculated coolant entering the mixer is adjusted.

5. A method for controlling temperature of a polymerization process comprising:

providing a system of claim 1, in which reaction effluent is cooled by recirculating said effluent through said heat exchanger which is cooled by said secondary cooling system having the coolant feed line fed by a combination of fresh coolant and recycled coolant, continuously measuring polymerization reaction temperature of said process via said primary temperature controller and generating a coolant adjust signal for use in adjusting coolant temperature; and adjusting the temperature of said coolant combination before entering said heat exchanger in response to said coolant adjust signal via said secondary temperature controller.

6. The method as defined in claim 5 further comprising:

continuously measuring temperature of said coolant combination before entering said heat exchanger and generating a secondary signal for use in adjusting the proportion of said fresh coolant to said recycled coolant.

* * * * *